(12) United States Patent
Wolcott

(10) Patent No.: US 6,685,253 B1
(45) Date of Patent: Feb. 3, 2004

(54) POWER SLIDING DOOR WIRE HOUSING

(75) Inventor: Mark David Wolcott, Westland, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/999,740

(22) Filed: Oct. 31, 2001

(51) Int. Cl.⁷ .................................................. B60J 5/06
(52) U.S. Cl. ................................................... 296/155
(58) Field of Search ......................................... 296/155

(56) References Cited

U.S. PATENT DOCUMENTS

| | | | |
|---|---|---|---|
| 5,239,779 A | | 8/1993 | DeLand et al. ............... 49/360 |
| 5,322,339 A | * | 6/1994 | Dubernard .................. 296/155 |
| 5,389,920 A | | 2/1995 | DeLand et al. ........ 340/825.69 |
| 5,536,061 A | | 7/1996 | Moore et al. ............... 296/155 |
| 5,599,086 A | * | 2/1997 | Dutta .......................... 296/214 |
| 5,921,612 A | | 7/1999 | Mizuki et al. .............. 296/155 |
| 6,076,883 A | * | 6/2000 | Labonde et al. ............ 296/155 |
| 6,099,066 A | * | 8/2000 | Corn ........................ 296/97.11 |
| 6,108,976 A | * | 8/2000 | Kato et al. .................... 49/360 |
| 6,161,894 A | * | 12/2000 | Chapman ..................... 296/155 |
| 6,174,020 B1 | * | 1/2001 | Knettle et al. .............. 296/155 |
| 6,176,715 B1 | * | 1/2001 | Buescher .................... 439/162 |
| 6,244,652 B1 | * | 6/2001 | Shoudou et al. ............ 296/155 |
| 6,358,073 B1 | * | 3/2002 | Jhanson et al. ............. 439/164 |
| 6,494,523 B2 | * | 12/2002 | Kobayashi .................. 296/155 |

FOREIGN PATENT DOCUMENTS

| | | | | |
|---|---|---|---|---|
| FR | 2662552 | * | 11/1991 | .................. 296/155 |
| JP | 317828 | * | 12/1989 | .................. 296/155 |

* cited by examiner

Primary Examiner—Dennis H. Pedder
(74) Attorney, Agent, or Firm—Bill C. Panagos

(57) ABSTRACT

An apparatus supplies electrical power to a panel slideably mounted on a vehicle for movement along a predetermined path. The apparatus includes a vehicle component defining a slot having a length. The apparatus includes an electrical conduit for electrically connecting a power source and an electrical component mounted on the panel. The electrical conduit has an intermediate portion extending through the slot of the vehicle component such that the intermediate portion moves along the length of the slot as the panel moves along the predetermined path.

25 Claims, 6 Drawing Sheets

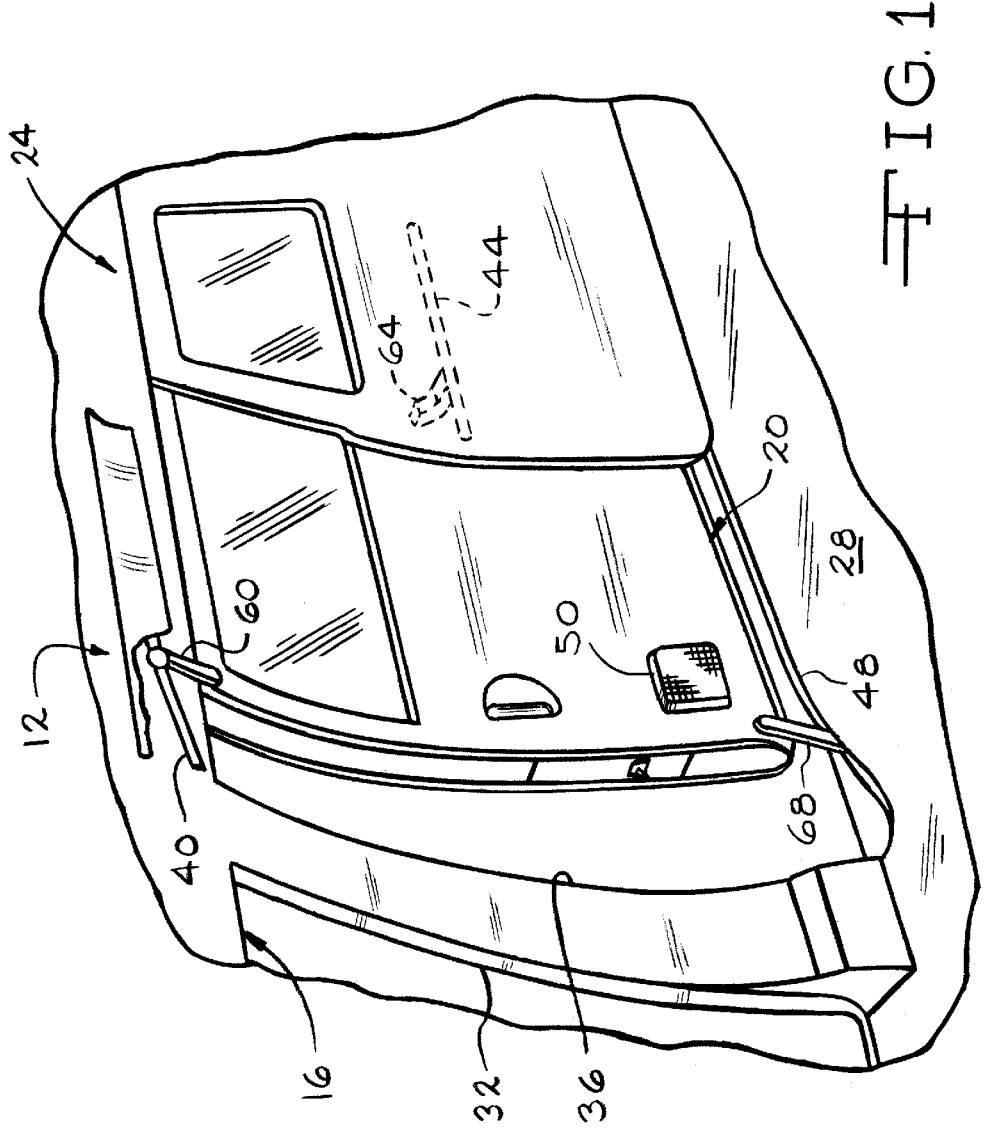

POWER SLIDING DOOR WIRE HOUSING

BACKGROUND

This invention relates in general to an automobile sliding door mechanism, and in particular to a mechanism useful for providing the sliding door with a power source. In automobiles, such as vans and the like, it is desirable to provide a relatively large side opening located behind the passenger side door in one or both of the sides of the vehicle. The side opening permits passenger and cargo access to the automobile interior. The side opening is generally opened and closed off with a sliding door. The sliding door is typically slideably mounted on horizontal tracks or the like. The tracks support a guided sliding movement to open and close the sliding door. The sliding door may be operated manually or with a power-operated system. An electric motor may be employed to operate the sliding door.

The sliding door desirably contains certain electrical components, such as for example, power windows, audio speakers, and lights, that require a power source for functionality. It has been known to supply electrical power to the electrical components from a power source through one or more contacts on the sliding door that couple with a generally equal number of contacts on the body of the automobile. However, when the sliding door is opened, the contacts on the sliding door uncouple with the contacts on the body, thus resulting in a loss of power supplied to the sliding door. This in turn results in a loss of functionality of the power features on the door. Power systems to maintain electrical power to the opened sliding door have been employed with less than optimal performance.

SUMMARY OF THE PREFERRED EMBODIMENTS

The above advantages as well as other advantages not specifically enumerated are achieved by an apparatus for supplying electrical power to a panel slideably mounted on a vehicle for movement along a predetermined path. The apparatus includes a vehicle component defining a slot having a length. The apparatus includes an electrical conduit for electrically connecting a power source and an electrical component mounted on the panel. The electrical conduit has an intermediate portion extending through the slot of the vehicle component such that the intermediate portion moves along the length of the slot as the panel moves along the predetermined path.

There is also provided a door mechanism for a vehicle having a body. The door mechanism includes a first panel and a second panel, the second panel defining an opening, the first panel and the second panel being spaced apart to define a gap therebetween. The door mechanism includes a door slideably mounted on the vehicle for movement between an opened position and a closed position. The door mechanism includes an electrical conduit having a first end and a second end, the second end extending through the opening and being operatively connected to the door, the electrical conduit being positioned in the gap.

BRIEF DESCRIPTION OF THE DRAWINGS

AS FIG. 1 is a schematic perspective view of a power sliding door in an opened position employing a door wire mechanism according to the invention.

DETAILED DESCRIPTION OF THE PREFERRED EMBODIMENTS OF THE INVENTION

Figure 2A:
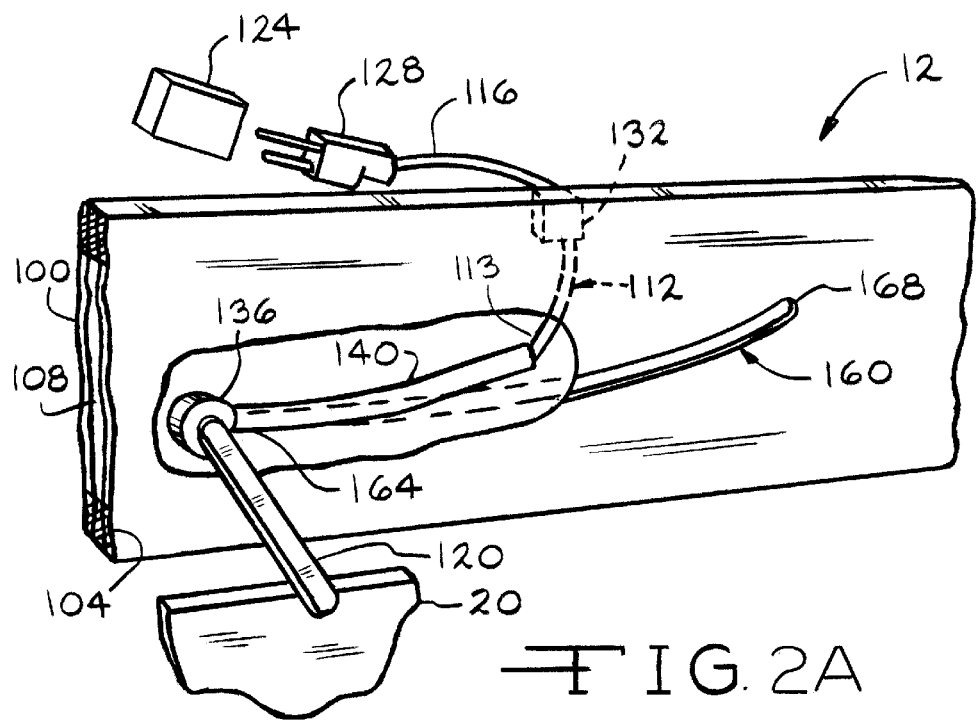
FIG. 2A is a schematic elevational view of the door wire mechanism of FIG. 1 in a door-open position.
Figure 2B:
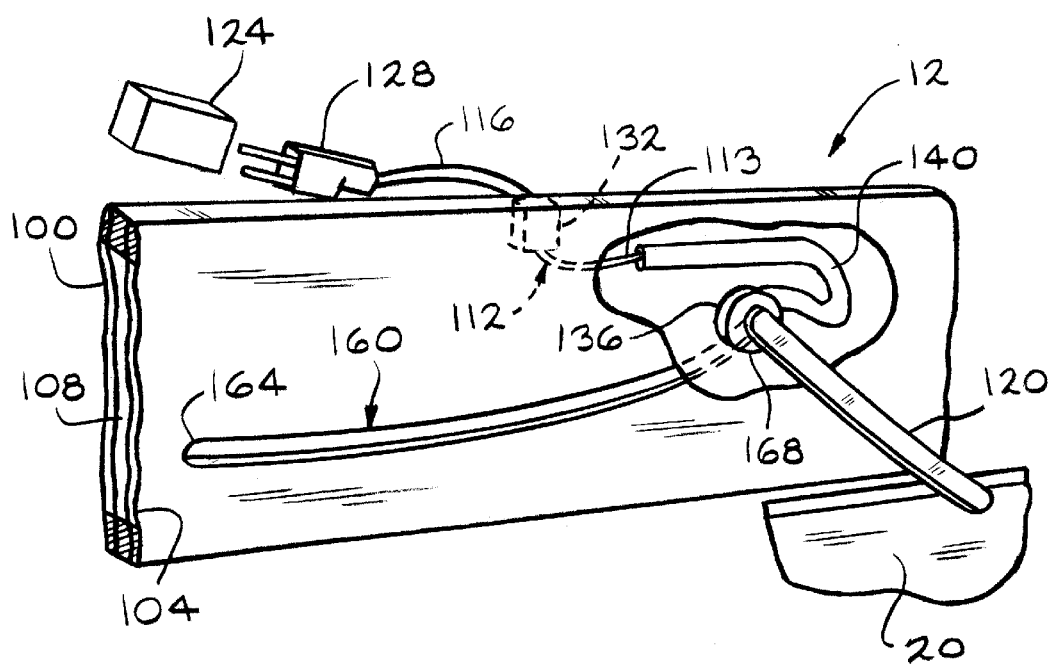
FIG. 2B is a schematic elevational view similar to FIG. 2A with the door wire mechanism in a door-closed position.
Figure 3:
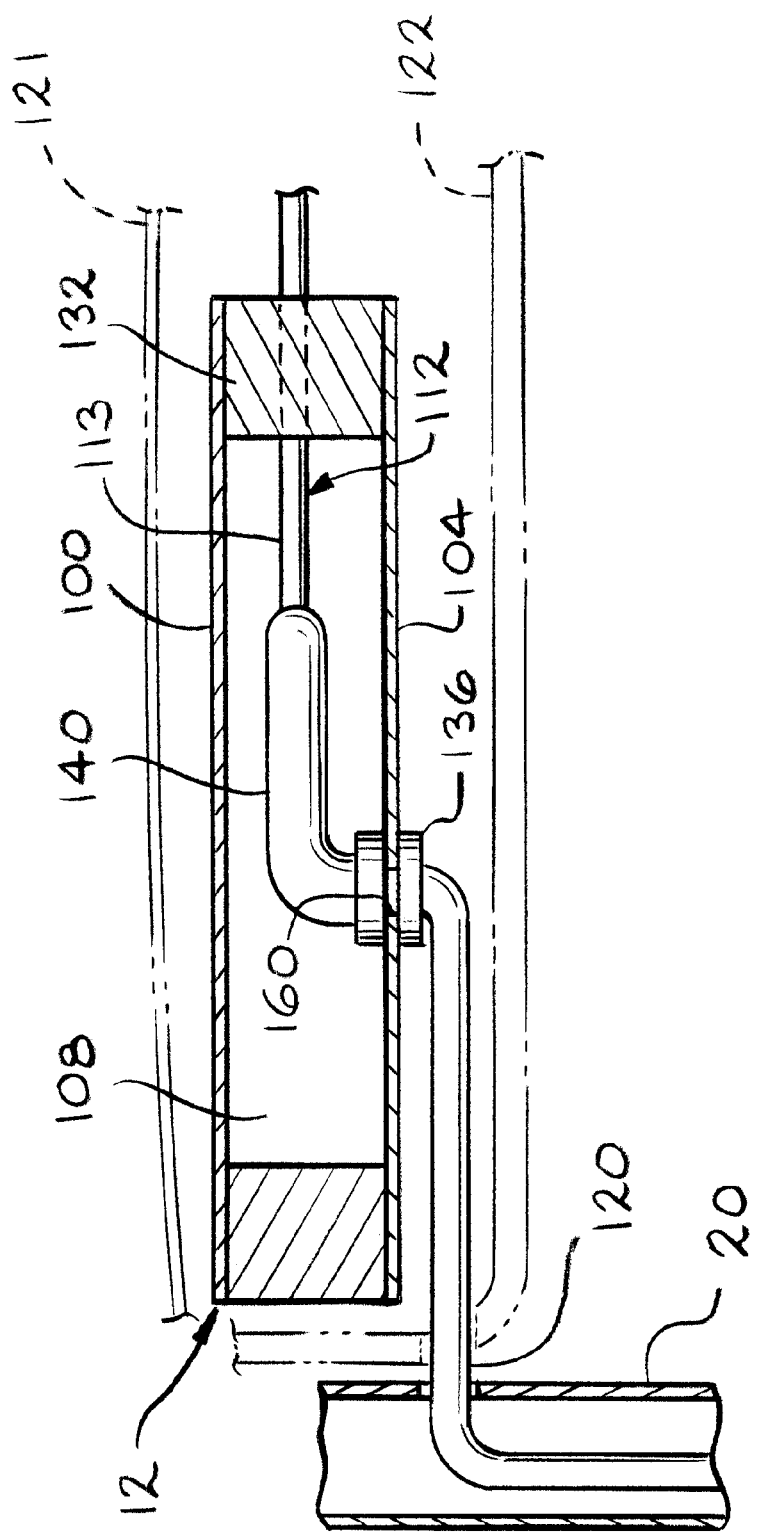
FIG. 3 is a schematic cross-sectional view in elevation of the door wire mechanism of FIGS. 2A and 2B according to the invention.

Referring now to FIGS. 1 through 3, there is illustrated a door wire mechanism 12 in accordance with the present invention. Generally, the door wire mechanism 12 provides a continuous supply of electrical power to various electrical components mounted in a door 20 regardless of the position of the door 20, as will be explained below. The door 20 is preferably a sliding door. The door 20 may also be replaced by any suitable panel or series of panels. Although this invention will be described and illustrated in conjunction with a vehicle sliding door as disclosed herein, it will be appreciated that this invention may be used in conjunction with any suitable component or panel. The general structure and operation of sliding doors is generally conventional in the art. For purposes of clarity in presentation, only those portions of the door which are necessary for understanding of this invention will be explained and illustrated in detail.

A vehicle body 16 includes the door 20. The body 16 defines a passenger compartment 24 having a floor 28, and preferably a side front opening 32 and a rear side opening 36 that provide access to the passenger compartment 24 on one side of the vehicle. The rear side opening 36 is positioned behind the side front opening 32, and is selectively opened and closed by the door 20. The side front opening 32 can be closed off by a hinged door (not shown). The illustrated door 20 is slideably mounted on the body 16. In a preferred embodiment, an upper guide track 40, a center guide track 44 and a lower guide track 48 are positioned on the body to support and allow movement of the door 20 relative to the vehicle body 16. The upper guide track 40, the center guide track 44 and the lower guide track 48 are positioned generally horizontally, and thus approximately parallel to each other. The upper guide track 40, the center guide track 44 and the lower guide track 48 are door support means and may be positioned other than as illustrated and may be mounted on the interior or exterior of the body 16 as desired. Likewise, other door support means may be used.

The door 20, or portions thereof, is preferably mounted for movement along a predetermined path. The predetermined path may be defined by the upper guide track 40. The center guide track 44 or the lower guide track 48 may also define the predetermined path. The predetermined path is preferably a generally curvilinear path, such that the door 20 moves generally outwardly and back as the door 20 initially begins to open. Then, the door 20 moves back generally straight until a more fully opened position is achieved. This curvilinear path can be seen as conforming to the shape of the upper guide track 40 and the lower guide track 48 in FIG. 1.

In a preferred embodiment, the door 20 is operatively connected to the upper guide track 40, the center guide track 44 and the lower guide track 48 by an upper guide arm 60, a center guide arm 64 and a lower guide arm 68, respectively. An upper roller assembly (not shown), a center roller assembly (not shown) and a lower roller assembly (not shown) are preferably included to secure the door 20 to the body 16. The upper roller assembly, the center roller assembly and the lower roller assembly preferably cooperate with the upper guide arm 60, the center guide arm 64 and the lower guide arm 68 to connect the door 20 to the upper guide track 40, the center guide track 44 and the lower guide track 48, respectively.

The door wire mechanism 12 is preferably positioned adjacent to the door 20 and spaced apart from the upper guide track 40. The door wire mechanism 12 may otherwise be positioned generally adjacent to the door 20 and spaced apart from the lower guide track 48, or at any other suitable location. The door wire mechanism 12 is preferably mounted on the passenger compartment 24 of the body 16. An electrical component 50 is mounted on the sliding door 20. The electrical component 50 may be any suitable electrical device in which it is desired to provide power thereto even if the door 20 is in an opened position. Examples of the electrical component 50 include speakers for use with a vehicle sound system, motors to operate moveable windows and/or locks, interior automotive components such as for example interior lights, or exterior components such as for example exterior lights.

Figure 3A:
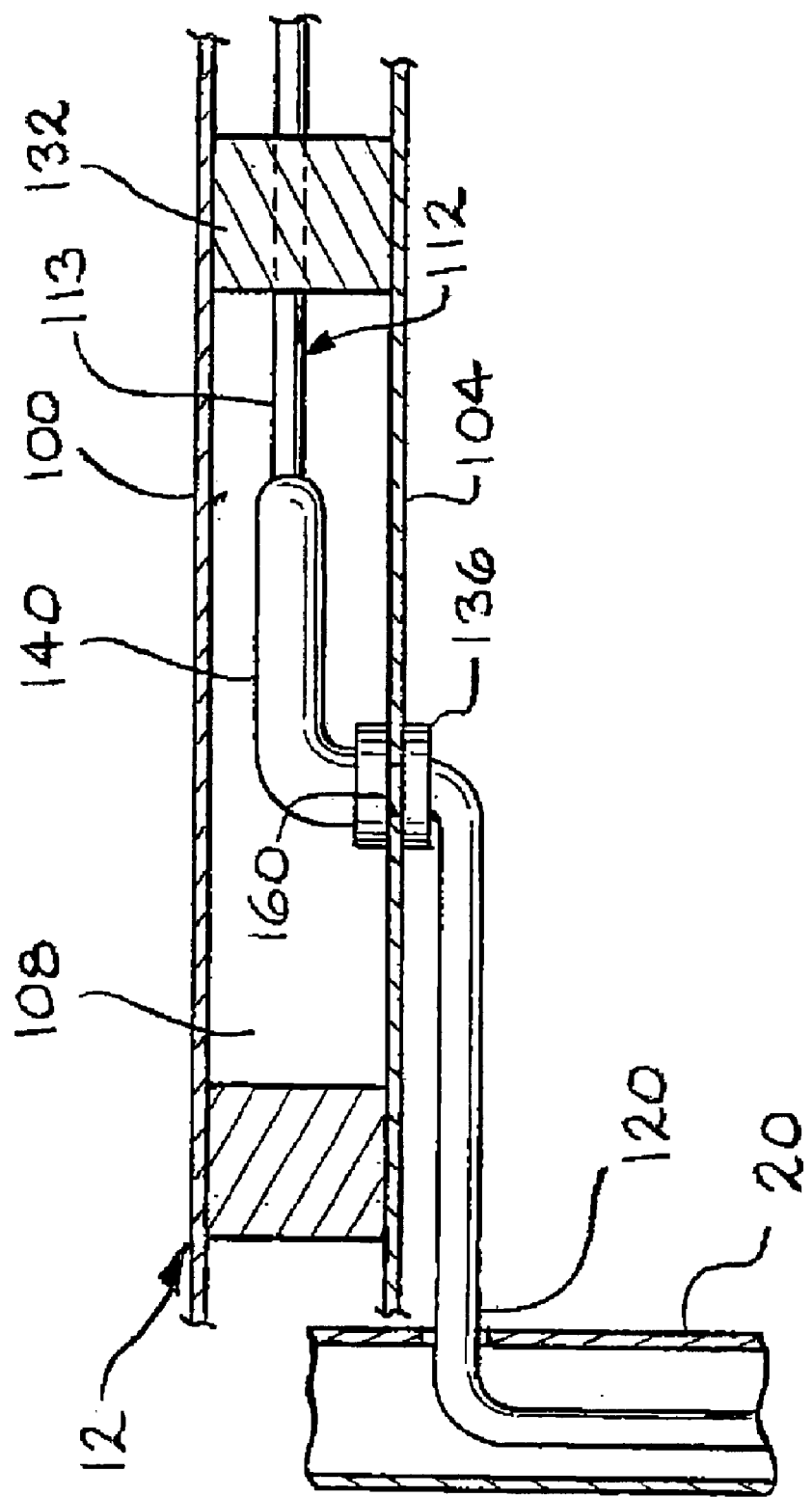
FIG. 3a is a schematic cross-sectional view in elevation of an alternate embodiment of the door wire mechanism according to the invention.

In a preferred embodiment, the door wire mechanism 12 has a separate housing including a first panel 100 and a second panel 104. The first panel 100 and the second panel 104 may be separate panels, or may be integrally formed, to define a slot or gap 108 between them. If desired, the first panel 100 and the second panel 104 may be separate structures, but integral with existing vehicle components. By way of illustration, the first panel 100 may be part of the body 16, such as for example the roof panel of the vehicle, as is best shown in FIG. 3*a*. By way of illustration, the second panel 104 may be a lining or a layer of the passenger compartment 24, such as for example a headliner of the vehicle, as is also best shown in FIG. 3*a*. The first panel 100 and the second panel 104 are positioned generally parallel to each other, although they need not be so positioned. Likewise, the first panel 100 and the second panel 104 may also be individual plates connected together and spaced apart from each other. The first panel 100 and the second panel 104 may be flat, although they do not need to be flat. The first panel 100 and the second panel 104 may be contoured to conform to features of the passenger compartment 24. The first panel 100 and the second panel 104 define vehicle components.

In a preferred embodiment, an electrical conduit 112 having a first end 116 and a second end 120 is provided. The electrical conduit 112 further including an intermediate portion 113 is generally positioned with the gap 108. The electrical conduit 112 may be any suitable electrical wire, conductive tape or any other suitable structure operative to deliver power. The electrical conduit 112 is not limited to electrically conductive structures, and may be a suitable thermal or optical conduit. The electrical conduit 112 is preferably rigid, although it may be flexible. The term "rigid" in understood to include a structure able to resist deformation so as to retain an existing general shape and size. The term "flexible" in understood to include a structure having the property of flexibility, able to be repeatedly bent and still maintain its original shape afterward.

The first end 116 of the electrical conduit 112 is preferably rigid, although it may be flexible. Likewise, the second end 120 of the electrical conduit 112 is preferably rigid, although it may be flexible. The first end 116 of the electrical conduit 112 is preferably operatively connected to a power source, schematically represented at 124, by a suitable coupling 128. Any suitable power source 124 may be used, such as for example the vehicle storage battery. The power source 124 may be positioned at any suitable location.

At least one suitable optional tab 132 may be provided to selectively limit the movement of the electrical conduit 112 within the gap 108. The tab 132 is preferably fixed to the first panel 100 or the second panel 104 or both. The second end 120 is preferably operatively connected to the door 20. An optional stopper 136 may also be employed. The stopper 136 preferably functions as a bushing to permit travel of the intermediate portion 113 of the electrical conduit 112 along a slot 160, as will be further described below. The stopper 136 is preferably coupled to the electrical conduit 112 and positioned between the first end 116 and the second end 120 of the electrical conduit 112.

A sleeve 140 is preferably provided for the electrical conduit 112. The sleeve 140 preferably covers the outer surface of the electrical conduit 112. The sleeve 140 may be positioned as desired to cover a portion of the intermediate portion 113 of the electrical conduit 112. In a preferred embodiment, the sleeve 140 includes a low-friction material. The sleeve 140 is operative to support movement of the electrical conduit 112. The sleeve 140 may include a layer of polyvinyl chloride "PVC" or any other suitable type of plastic or other material.

A slot or an opening 160 in the second panel 104 is preferably provided for the electrical conduit 112. The illustrated opening 160 includes a first end 164 and a second end 168. The illustrated opening 160 is a longitudinal groove in the second panel 104, although the opening 160 may be otherwise shaped and located. The opening 160 is preferably in communication with the gap 108. The opening 160 may be included in the upper guide track 40. Likewise, the opening 160 may be the upper guide track 40. In a preferred embodiment, the opening 160 generally follows or conforms to the contour or shape of the lower guide track 48. The opening 160 may also generally follow the contour of the upper guide track 40. It will be appreciated that the opening 160 generally conforms to the predetermined path of the door 20. Thus, the opening 160 in the second panel 104 may have a generally curvilinear shape. The term "curvilinear" is understood to include shapes consisting of, represented by, or bound by curved lines, such as for example the shape of the illustrated opening 160.

In operation, as the door 20 moves from an opened position to a closed position the intermediate portion 113 of the electrical conduit 112 that extends through the opening 160 may also move. In general, the intermediate portion 113 of the electrical conduit 112 will move along the contour of the opening 160, which will approximately follow the contour of the predetermined path of the door 20 as the door moves to an opened position. In a preferred embodiment, the intermediate portion 113 moves along the length of the opening 160 as the door 20 moves along the predetermined path. FIG. 2*a* and FIG. 2*b* illustrate possible positions of the electrical conduit 112 when the door 20 moves from a door-open position to a door-closed position, respectively. It will be appreciated that the electrical conduit 112 is in a different, and more coiled position in FIG. 2*b*. It should be understood that the electrical conduit 112 may be in a relatively more coiled position in either a door-open position or a door-closed position.

FIG. 3 shows the door wire mechanism 12 positioned between a vehicle roof panel 121 and a vehicle headliner 122. The roof panel 121 and the headliner 122 are merely illustrative of two panels between which the door wire mechanism 12 may be positioned. The door wire mechanism 12 may be positioned between any two suitable vehicle components, such as for example trim panels or component panels, or portions thereof The second panel 104 is illustrated spaced apart from the headliner 122, although the second panel 104 may contact the headliner 122. The second panel 104 may also be fixed to the headliner 122 by a suitable fastener mean, weld, or adhesive means. The first panel 100 is illustrated spaced apart from the roof panel 121 although the first panel 100 may contact the roof panel 121. The first panel 100 may also be fixed to the roof panel 121 by a suitable fastener mean, weld, or adhesive means.

It will be appreciate that the electrical conduit 112, preferably the intermediate portion 113 thereof, is disposed within the gap 108 and extends through the opening 160 in the second panel 104. The electrical conduit 112 is illustrated to extend between the second panel 104 and the headliner 122. The electrical conduit 112 is illustrated spaced apart from the roof panel 121. The second end 120 of the electrical conduit 112 is operatively connected to the door 20.

Figure 4:
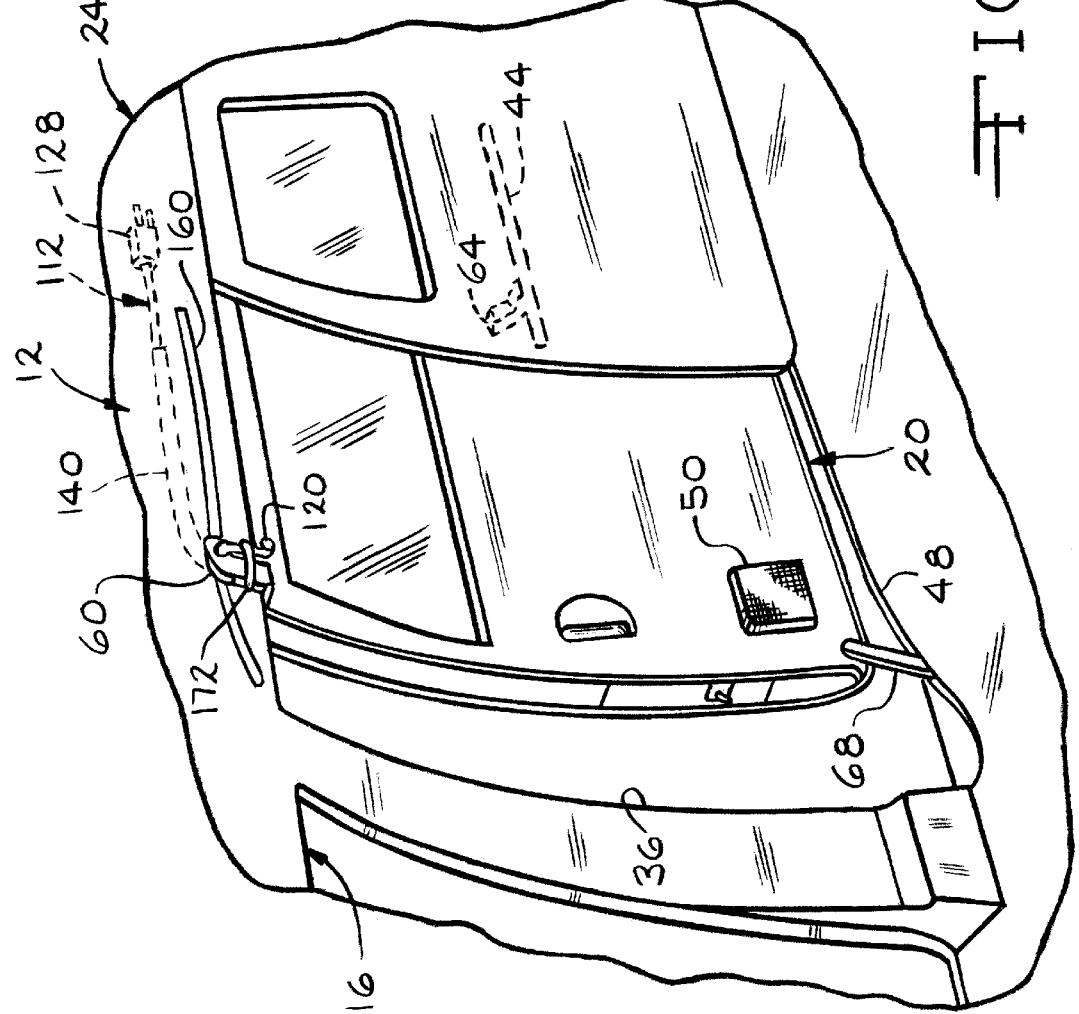
FIG. 4 is a schematic perspective view of a power sliding door in an opened position employing an alternate embodiment of the door wire mechanism according to the invention.

FIG. 4 shows an alternate embodiment of the door wire mechanism 12. The door 20 is supported on the body 16 by the upper guide arm 60. The upper guide arm 60 is positioned in the opening 160 of the door wire mechanism 12. The illustrated electrical conduit 112 is positioned to extend through the opening 160. The electrical conduit 112 may also be positioned to extend through a hollow portion of the guide arm 60. The second end 120 of the electrical conduit 112 is coupled to the door 20. The electrical conduit 112 is operative to supply power to the electrical component 50. An optional support band 172 is shown. The support band 172 is operative to couple the upper guide arm 60 and the electrical conduit 112. The support band 172 may be made of rubber, plastic, metal, or any other suitable material. In a preferred embodiment, when the door wire mechanism 12 is employed as illustrated in FIG. 4, the electrical conduit 112 may be positioned between the roof panel of the vehicle and a layer of the passenger compartment 24, such as for example the headliner.

Figure 5:
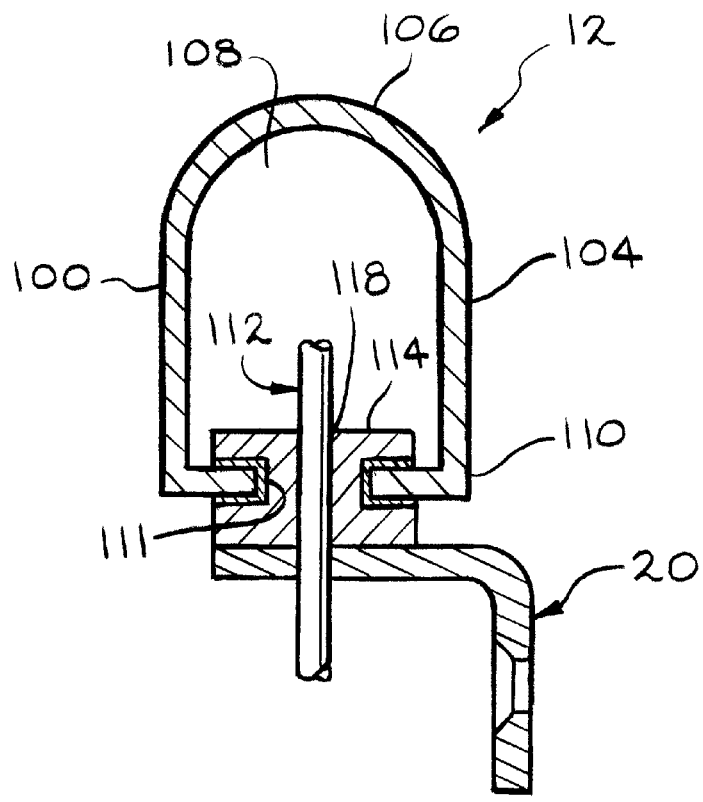
FIG. 5 is cross-sectional view of an alternate embodiment of a door wire mechanism according to the invention.
Figure 6:
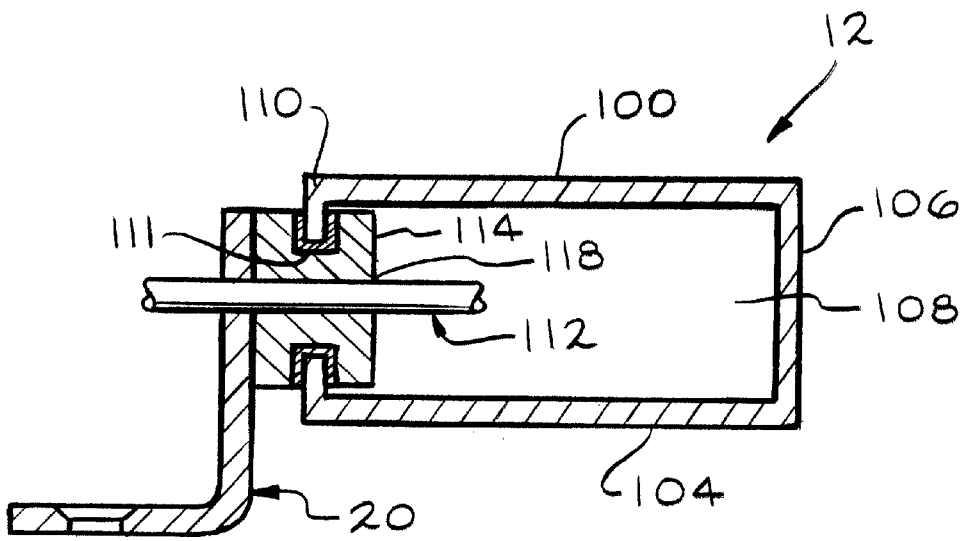
FIG. 6 is cross-sectional view of another alternate embodiment of a door wire mechanism according to the invention.

Other embodiments of the door wire mechanism 12 are contemplated, two of which are illustrated in FIG. 5 and FIG. 6. The door wire mechanism 12 illustrated in FIG. 5 includes the first panel 100 and the second panel 104 to define the gap 108. The first panel 100 and the second panel 104 are joined at an optionally closed end 106. The closed end 106 includes a generally straight portion as illustrated in FIG. 5. The closed end 106 includes a generally curved portion as illustrated in FIG. 6. The first panel 100 and the second panel 104 are spaced apart at an open end 110 of the door wire mechanism 12, thus defining a slot 111. The open end 110 supports an optional bushing 114. The bushing 114 is operative to cushion noise, friction, or movement by the door wire mechanism 12 as desired. The bushing 114 also helps prevent wear of the electrical conduit 112 as it travels only the slot 111. The bushing 114 includes an opening 118 therein. The electrical conduit 112 is provided in the opening 118 to extend between the gap 108 between the first panel 100 and the second panel 104. The first panel 100 and the second panel 104 define a vehicle component, which is a housing. It will be appreciated that the door wire mechanism 12 may be positioned generally vertical or generally horizontally as desired in the vehicle. The electrical conduit 112 is operative to supply power to the electrical component 50 (shown in FIGS. 1 and 2).

Alternate embodiments of the door wire mechanism 12 are contemplated. The door 20 of the invention may be replaced with another type of panel, the panel being positioned at another portion of the body 16 or the passenger compartment 24. For example, the door wire mechanism 12 may be employed with a "sun roof" or similar panel structure. Likewise, the door wire mechanism 12 may be employed with a panel that includes a retractable storage covering. Indeed, the door wire mechanism 12 may be employed with any suitable panel or series of panels.

The principle and mode of operation of this invention have been explained and illustrated in its preferred embodiments. However, it must be understood that this invention may be practiced otherwise than as specifically explained and illustrated without departing from its spirit or scope.

What is claimed is:

1. A door mechanism for a vehicle having a body defining a passenger compartment comprising:

a first panel and a second panel, the second panel defining an opening, the first panel and the second panel being spaced apart to define a gap communicating directly with the passenger compartment therebetween;

a door slideably mounted on the vehicle by a guide arm attached to the door and extending through the opening for movement between an opened position and a closed position;

an electrical conduit having a first end and a second end, the second end extending through the opening and being operatively connected to the door, the electrical conduit being positioned in the gap.

2. The door mechanism of claim 1 wherein the opening defined by the second panel has a curvilinear shape.

3. The door mechanism of claim 1 wherein the first panel is the body of a vehicle.

4. The door mechanism of claim 1 wherein the second end of the electrical conduit is rigid.

5. The door mechanism of claim 1 further comprising a stopper, the stopper being positioned in the gap and the stopper being coupled with the electrical conduit.

6. The door mechanism of claim 1 further comprising a sleeve covering the outer surface of the electrical conduit.

7. The door mechanism of claim 1 further comprising an electrical component wherein the electrical conduit is positioned to provide power to the electrical component.

8. The door mechanism of claim 1 further comprising an electrical component wherein the electrical conduit is operatively connected to an electrical component.

9. A door mechanism for a vehicle having a body defining a passenger compartment having a head linear comprising:

a first panel and a second panel, one of the first panel and the second panel defining an opening in direct communication with the passenger compartment, the first panel and the second panel being spaced apart to define a gap therebetween;

a door slideably mounted on the vehicle by a guide arm extending through the opening for movement between an opened position and a closed position;

an electrical conduit having a first end and a second end, the second end being operatively connected to the d(or through the opening, the electrical conduit being positioned in the gap.

10. The door mechanism of claim 9 wherein the opening has a curvilinear shape.

11. The door mechanism of claim 9 wherein the first panel is the body of a vehicle.

12. The door mechanism of claim 9 further comprising a stopper, the stopper being positioned in the gap and the stopper being coupled with the electrical conduit.

13. The door mechanism of claim 9 further comprising a sleeve covering the outer surface of the electrical conduit.

14. The door mechanism of claim 9 further comprising an electrical component wherein the electrical conduit is positioned to provide power to the electrical component.

15. The door mechanism of claim 9 further comprising an electrical component wherein the electrical conduit is operatively connected to the electrical component.

16. The door mechanism of claim 9 wherein the first panel is positioned adjacent to the body of the vehicle.

17. The door mechanism of claim 9 wherein the second panel is positioned adjacent to the liner of the vehicle.

18. The door mechanism of claim 1 wherein a portion of the guide arm is hollow for receiving a portion of the electrical conduit.

19. The door mechanism of claim 18 wherein the portion of the guide arm is slideably disposed in said slot.

20. The door mechanism of claim 1 wherein the first panel and the second panel are a vehicle roof and a vehicle headliner, respectively.

21. The door mechanism of claim 1 wherein the first panel and the second panel are disposed between a vehicle roof and a vehicle headliner.

22. The door mechanism of claim 1 wherein one of the panels is at least a portion of a vehicle headliner.

23. The door mechanism of claim 9 wherein the first panel and the second panel are a vehicle roof and a vehicle headliner, respectively.

24. The door mechanism of claim 9 wherein the first panel and the second panel are disposed between a vehicle roof and a vehicle headliner.

25. The door mechanism of claim 9 wherein one of the panels is at least a portion of a vehicle headliner.

* * * * *

UNITED STATES PATENT AND TRADEMARK OFFICE
CERTIFICATE OF CORRECTION

PATENT NO. : 6,685,253 B1 Page 1 of 1
DATED : February 3, 2004
INVENTOR(S) : Mark David Wolcott It is certified that error appears in the above-identified patent and that said Letters Patent is hereby corrected as shown below:

<u>Column 6,</u>
Line 51, delete "head linear" and insert -- headliner --;
Line 61, delete "d(or" and insert -- door --.

Signed and Sealed this

Thirteenth Day of April, 2004

JON W. DUDAS
*Acting Director of the United States Patent and Trademark Office*